United States Patent [19]
Holland et al.

[11] Patent Number: 5,005,414
[45] Date of Patent: Apr. 9, 1991

[54] ACCELERATION PICKUP

[75] Inventors: Martin Holland, Tübingen; Botho Ziegenbein; Dieter Seipler, both of Reutlingen, all of Fed. Rep. of Germany

[73] Assignee: Robert Bosch GmbH, Stuttgart, Fed. Rep. of Germany

[21] Appl. No.: 347,330

[22] Filed: May 3, 1989

[30] Foreign Application Priority Data

May 3, 1988 [DE] Fed. Rep. of Germany ....... 3814950

[51] Int. Cl.$^5$ ............................................. G01P 15/12
[52] U.S. Cl. .................................... 73/517 R; 338/5
[58] Field of Search ...................... 73/517 R; 338/2, 5

[56] References Cited

U.S. PATENT DOCUMENTS

| 4,129,042 | 12/1978 | Rosvold | 73/517 R |
|---|---|---|---|
| 4,311,980 | 1/1982 | Prudenziati | 338/2 |
| 4,553,436 | 11/1985 | Hansson | 73/517 R |
| 4,656,750 | 4/1987 | Pitt et al. | 73/517 R |
| 4,782,319 | 11/1988 | Dell'Acqua et al. | 338/5 |
| 4,825,696 | 5/1989 | Seipler | 73/517 R |
| 4,864,271 | 9/1989 | Yajima | 338/5 |

Primary Examiner—John Chapman
Attorney, Agent, or Firm—Michael J. Striker

[57] ABSTRACT

An acceleration pickup for releasing occupant protecting devices in power vehicles has a housing, a ceramic plate which acts as a bending spring and is clamped at its one end in the housing, and expansion-sensitive resistances arranged in the ceramic plate. The housing is composed of several layers of ceramic structural parts and is produced by a thick film technique.

5 Claims, 2 Drawing Sheets

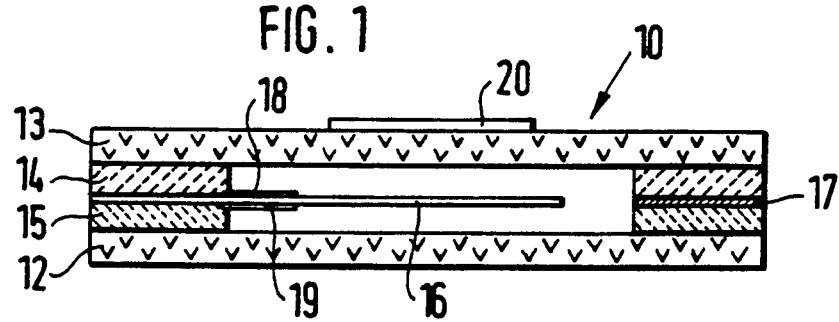
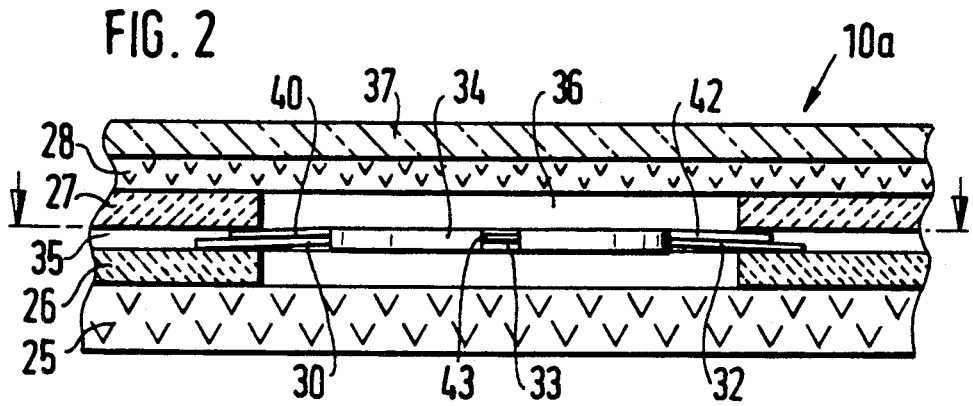
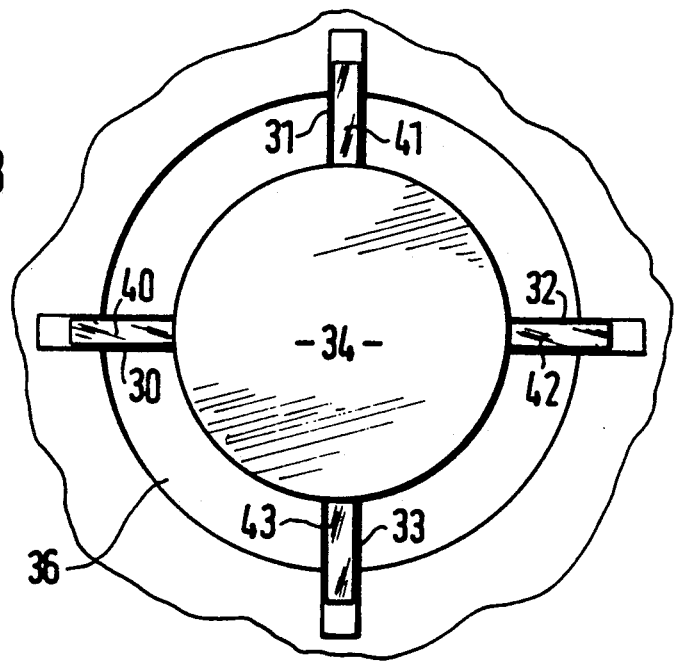

FIG.4
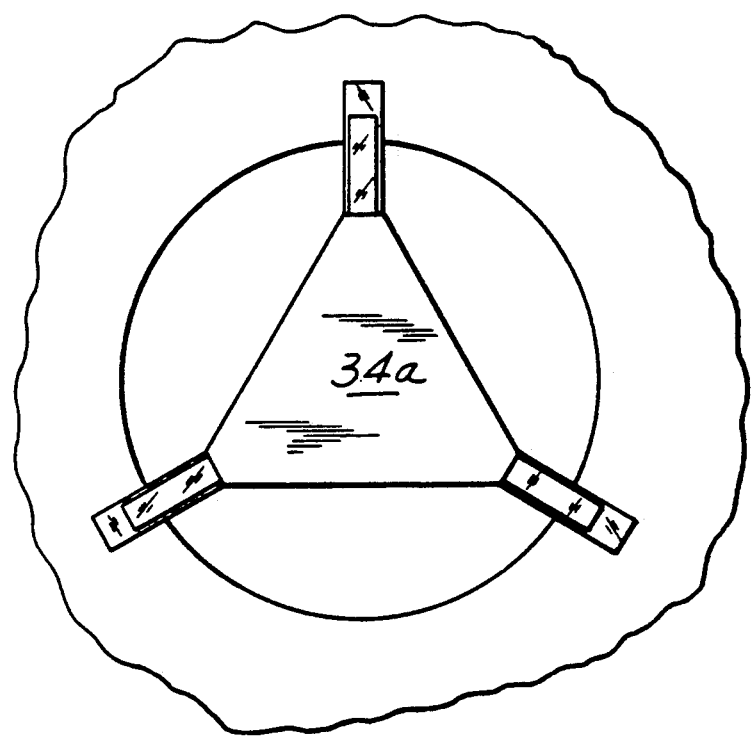
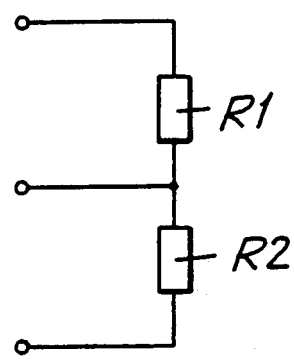
FIG.5

ACCELERATION PICKUP

BACKGROUND OF THE INVENTION

The present invention relates to an acceleration pickup. More particularly, it relates to an acceleration pickup for releasing occupant protecting devices in power vehicles of the type in which a ceramic plate acting as a bending spring is clamped on the one hand in a housing, and expansion-sensitive resistances are arranged on the ceramic plate.

Acceleration pickups of the above mentioned general type are known in the art. In the above described acceleration pickup which has a bending spring composed of a ceramic material and clamped at its one end, the thick layer resistances arranged on the bending spring determine the bending of the bending spring. The housing in which the bending spring is clamped is composed of synthetic plastic material. As a result of this, the manufacture of such an acceleration pickup is relatively expensive.

SUMMARY OF THE INVENTION

Accordingly, it is an object of the present invention to provide a acceleration pickup which avoids the disadvantages of the prior art.

More particularly, it is an object of the present invention to provide an acceleration pickup which has a simple construction and is relatively inexpensive.

In keeping with these objects and with others which will become apparent hereinafter, one feature of the present invention resides, briefly stated, in an acceleration pickup of the above mentioned type, in which the housing is composed of several layers of ceramic parts produced by a thick film technology.

When the acceleration pickup is designed in accordance with the present invention it avoids the disadvantages of the prior art and provides for the above specified advantages. The whole pickup can be produced with the same technology.

The air which is enclosed in the housing during the manufacture acts simultaneously as a damping fluid for the bending spring. The housing can be however also filled with another damping fluid, for adjusting the damping of the swinging bending spring to the desired field of application. Simultaneously, the housing serves as an overloading protection for the bending spring. When an excessively high acceleration acts on the pickup, the amplitude of the swinging bending spring is limited by the housing. Also a damage of the bending spring, especially its breakage is prevented.

The evaluation circuit signals a maximum deviation by which an overload can be determined. The evaluating circuit is arranged on the upper and lower sides of the housing which as a mechanical protection for the bending spring has a relatively great thickness and therefore high strength. On the circuit arranged in such a manner, no disturbing factors act due to a mechanical deformation, especially the temperature factors. In contrast to the sensors in which the circuit is arranged on the bending spring, the bending spring can be made relatively thin and therefore the sensitivity of the pickup can be increased.

Furthermore, by the arrangement of the resistances on the lower and upper surfaces of the bending spring, a high sensitivity of the pickup is also possible. Simultaneously, a measuring failure such as for example one resulting from temperature fluctuations can be eliminated. Also, the shape of the bending spring can be adjusted to the desired sensitivity of the acceleration pickup. Especially a selection of the release threshold in one direction is possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 showing a section of an acceleration pickup in accordance with the present invention;

FIG. 2 is a view substantially corresponding to the view of FIG. 1 but showing a second embodiment of the present invention;

FIG. 3 is a view showing another embodiment with a different bending spring of the inventive acceleration pickup; and FIGS. 4 and 5 show two further embodiments of the invention.

DESCRIPTION OF THE PREFERRED EMBODIMENTS

FIG. 1 shows an acceleration pickup in accordance with the present invention. It has a housing which is identified as a whole with reference numeral 10. The housing is composed of several layers of a ceramic material, for example aluminum oxide ($Al_2O_3$). It has a ceramic bottom 12 and a cover 13. A bending spring 16 is arranged between both side parts 14 and 15. The bending spring 16 is clamped between these parts and composed also of a ceramic material. A compensating member 17 is located in the region between the side parts 14 and 15.

Expansion-sensitive sensor resistances 18 and 19 are arranged on the bending spring 16 on its upper side and lower side, respectively. They are arranged in the region of clamping of the bending spring. The sensor resistances 18 and 19 are applied on the bending spring 16 with the use of a thick film technique. If only one sensor resistance is arranged on the upper side and the lower side respectively, then these resistances are connected in a half Wheatstone bridge circuit as shown in FIG. 5. It is however especially advantageous when on the upper surface and the lower surface, respectively, two sensor resistances are arranged and connected in a so-called Wheatstone bridge circuit. The sensor resistances operate in accordance with the piezo-resistive principle. Furthermore, a evaluating circuit 20 is arranged on the upper side of the cover 13 and also applied by a thick film technique. It has active, for example reinforcing members (semiconductors) and passive, for example R-, C-structural elements. Both the evaluating circuit 20 and the sensor resistances 18, 19 can be applied in a screen printing technique and in the same working step.

Electrical conductors lead from the evaluating circuit 20 to a not shown control device which can release the occupant protecting devices of the vehicle, such as for example a seatbelt or an airbag.

The housing 10 can be produced with a so-called green sheet technology. For this purpose the individual layers such as for example the bottom 12, the cover 13, the side parts 14, 15 and the bending spring 16 are composed of so-called green ceramic. Green ceramic identifies the condition of the layers before sintering, in condensed conditions. These layers are assembled and subsequently sintered. The air which is enclosed in the housing acts simultaneously as damping fluid for the bending spring 16. The thickness of the side parts 14, 15 is as thin as possible, for allowing a low bending of the bending springs.

As an alternative, it is also possible to produce the housing 10 from finally sintered layers. The individual layers are connected with one another by glazing and gluing.

For glazing, low-melting glass layers are applied with screen printing technique and subsequently the individual parts are placed over one another. By melting the glass layers are connected to form a rigid unit.

In the embodiment shown in FIG. 2, the acceleration pickup has a housing which is identified with reference numeral 10a and is somewhat different from that of the first embodiment. The pickup in accordance with this embodiment has a substrate plate 25 which is composed of ceramic, glass or metal plateen melled on its upper surface. The individual layers are produced in accordance with the pressure and combustion processes by the thick film technique and evaporated. For this purpose, several layers 26, 27 and a cover plate 28 composed of a ceramic dielectric material such as for example glass ceramic are applied as a paste by screen printing process one after the other on the substrate plate 25. Four bending webs 30-33 are arranged between both layers 26, 27 as shown in FIG. 3. These layers are a part of a bending spring 34 which acts as a seismic mass and is also composed of a ceramic material. An equalizing layer 35 is located between bending webs 30-33.

A hollow chamber 36 required for the swinging of the bending spring 34 is formed above and below the bending spring 34. It can be filled with a filler, for example a soot with organic admixtures. In the subsequent sintering process, for example at temperature about 950° C. in protective atmosphere, the filler prevents the connection in the region of the of bending spring 34 of the material of the bending spring 34 with the substrate 25 and the cover plate 28 and the bending spring 34. Simultaneously, the ceramic material of the layers 26, 27, the equalizing layer 35 and the cover layer 28 are sintered together to form a rigid mass. The filler is burnt during sintering with no residues. It is important that the cover plate 28 without the layers 26, 27 produces sufficiently thin side walls, and does not have too small porosity and a pressure equalization can occur. By applying a further layer, for example an amorphous glass layer 37, the produced hollow chamber 36 is closed in a gas-tight manner, so that the enclosed air acts as a damping fluid.

As can be seen from FIG. 3, the bending spring 34 is formed as a disc and the four bending webs 30-33 are arranged at a distance of approximately 90°. Thereby a high vertical sensitivity of the acceleration pickup is achieved. Each of the bending bars carry a piezo-resistive resistance 40-43 arranged in a Wheatstone bridge circuit. As in the embodiment of FIG. 1, these resistances are also produced in thick film technique and in the same manufacturing step. Both the housing of the acceleration pickup and its bending spring and its resistances are produced in one single working step.

It is also possible to support a bending spring only with three bending bars. In the event of the three bending springs, thebending bars are arranged at a distance of 120° relative to one another. Further, in each case the bending spring can be composed as an equilateral triangler 34a, on which corners the bending rods are arranged as shown in FIG. 4.

The operation of an acceleration pickup in accordance with the present invention is known and therefore is not described in great detail. When the bending spring 16 or 34 is deviated from its rest position, it is bent in the region of the bending resistances 18, 19 or 40, 33 and in them a proportional resistance change is produced. This resistance change is evaluated in the evaluating circuit and supplied further to the control device.

It is however possible instead of a disc, to arrange a bending spring with two bending bars in the housing 10. Between the bending bars, a recess can be located. The bending bars must be spaced from one another at a distance which is as great as possible, for example extend in alignment to the edges of the bending spring so that no torsion of the bending spring is possible.

The expansion-sensitive resistances are arranged again on the bending bars. When the resistances are connected in a so-called Wheatstone bridge circuit with four resistances and one of the resistances is arranged on the bending spring, the operation and the mechanical condition of the bending spring can be monitored.

It will be understood that each of the elements described above, or two or more together, may also find a useful applicaiton in other types of constructions differing from the types described above.

While the invention has been illustrated and described as embodied in an acceleration pickup, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An acceleration pickup for releasing occupant protecting devices in power vehicles, comprising a housing; a ceramic plate which forms a bending spring and is clamped at least at its one end in said housing; and expansion-sensitive resistances arranged on said ceramic plate, said housing being composed of several layers of ceramic parts and produced, together with said bending spring and said resistances, by a thick film technique.

2. An acceleration pickup as defined in claim 1, wherein said bending spring has an upper surface and a lower surface, said resistances being arranged on said upper surface and said lower surface of said bending spring, the resistances being connected with one another at least in a half Wheatstone bridge circuit.

3. An acceleration pickup as defined in claim 1, wherein said bending spring is formed as a disc and provided with at least three bending webs which arrange said bending spring in said housing.

4. An acceleration pickup as defined in claim 1, wherein said bending spring is formed as an equilateral triangle and provided with bending bars located in corners of said triangle and mounting said bending spring in said housing.

5. An acceleration pickup as defined in claim 1, wherein said housing has an upper surface and a lower surface; and further comprising an evaluating circuit connected with said resistances and arranged on at least one of said surfaces of said housing.

* * * * *